(12) United States Patent
Falk

(10) Patent No.: US 12,334,726 B2
(45) Date of Patent: Jun. 17, 2025

(54) METHOD AND ARRANGEMENT FOR ASCERTAINING A LOAD FLOW MAP WITHIN AN AC-VOLTAGE POWER SUPPLY GRID

(71) Applicant: SMA Solar Technology AG, Niestetal (DE)

(72) Inventor: Andreas Falk, Kassel (DE)

(73) Assignee: SMA Solar Technology AG, Niestetal (DE)

( * ) Notice: Subject to any disclaimer, the term of this patent is extended or adjusted under 35 U.S.C. 154(b) by 290 days.

(21) Appl. No.: 17/831,767

(22) Filed: Jun. 3, 2022

(65) Prior Publication Data
US 2022/0294263 A1 Sep. 15, 2022

Related U.S. Application Data

(63) Continuation of application No. PCT/EP2020/081539, filed on Nov. 9, 2020.

(30) Foreign Application Priority Data

Dec. 6, 2019 (DE) ...................... 10 2019 133 405.5

(51) Int. Cl.
*H02J 13/00* (2006.01)

(52) U.S. Cl.
CPC ..... *H02J 13/00002* (2020.01); *H02J 2203/10* (2020.01)

(58) Field of Classification Search
CPC ............. H02J 13/00002; H02J 2203/10; H02J 3/0012; Y04S 10/30
See application file for complete search history.

(56) References Cited

U.S. PATENT DOCUMENTS

| | | | |
|---|---|---|---|
| 8,283,911 B1* | 10/2012 | Bierer | G01R 29/18 324/67 |
| 9,581,618 B1* | 2/2017 | McEachern | G01R 1/00 |

(Continued)

FOREIGN PATENT DOCUMENTS

| | | |
|---|---|---|
| DE | 102019133405 A1 | 6/2021 |
| EP | 3547481 A1 | 10/2019 |
| JP | 2000507343 A * | 11/1995 |

OTHER PUBLICATIONS

International Search Report Dated Dec. 22, 2020 for International Application No. PCT/EP2020/081539.

(Continued)

*Primary Examiner* — Incent H Tran
(74) *Attorney, Agent, or Firm* — Eschweiler & Potashnik, LLC

(57) ABSTRACT

A method for ascertaining a load flow map within an AC-voltage power supply grid, wherein a plurality of grid subscribers are each arranged at a respective grid connection point in the power supply grid, includes ascertaining, by each of the plurality of grid subscribers, a respective value reflecting an individual phase angle ($\phi$) of the AC voltage of the power supply grid at the respective grid connection point of each of the plurality of grid subscribers. The method also includes transmitting the respective values in the form of data from the respective plurality of grid subscribers to a superordinate data receiver; and evaluating the data and generating a load flow map based on the values reflecting the individual phase angles ($\phi$).

5 Claims, 3 Drawing Sheets

(56) References Cited

U.S. PATENT DOCUMENTS

| | | | |
|---|---|---|---|
| 10,459,022 B1* | 10/2019 | Bierer | G01R 29/18 |
| 10,997,852 B1* | 5/2021 | Bierer | G01R 25/005 |
| 11,002,775 B2 | 5/2021 | Litzinger et al. | |
| 2008/0140326 A1* | 6/2008 | Scholtz | G01R 29/18 |
| | | | 702/60 |
| 2011/0208364 A1* | 8/2011 | DeLoach, Jr. | H04Q 9/04 |
| | | | 709/248 |
| 2012/0173174 A1* | 7/2012 | Gaarder | H02J 13/00002 |
| | | | 702/58 |
| 2012/0217975 A1* | 8/2012 | Drazan | G01R 15/142 |
| | | | 324/522 |
| 2012/0310559 A1* | 12/2012 | Taft | H02J 13/00002 |
| | | | 702/62 |
| 2013/0051498 A1* | 2/2013 | Taft | G01R 19/2513 |
| | | | 375/340 |
| 2013/0073108 A1* | 3/2013 | Kolwalkar | G01R 19/2513 |
| | | | 700/298 |
| 2014/0070617 A1 | 3/2014 | Detmers et al. | |
| 2014/0244065 A1* | 8/2014 | Biswas | H02J 3/06 |
| | | | 700/298 |
| 2014/0340236 A1* | 11/2014 | Rhoads | G06Q 50/06 |
| | | | 340/870.02 |
| 2015/0381187 A1* | 12/2015 | Ahmed | H02J 3/01 |
| | | | 327/156 |
| 2016/0091537 A1* | 3/2016 | Gaarder | H04Q 9/00 |
| | | | 324/764.01 |
| 2016/0124421 A1* | 5/2016 | Hansell | H04B 3/56 |
| | | | 700/286 |
| 2016/0239010 A1* | 8/2016 | McDANIEL | H02J 13/00002 |
| 2018/0017602 A1* | 1/2018 | Gavrilov | G01R 31/42 |
| 2018/0292447 A1* | 10/2018 | Piyasinghe | G01R 21/133 |
| 2018/0348266 A1* | 12/2018 | Yao | G01R 19/2513 |
| 2020/0025810 A1* | 1/2020 | Bernstein | G02B 6/3861 |
| 2020/0293627 A1* | 9/2020 | Wang | G06F 30/367 |
| 2020/0371143 A1* | 11/2020 | Liu | G01R 25/00 |

OTHER PUBLICATIONS

IEEE Standards Association. IEEE Guide for Synchronization, Calibration, Testing, and Installation of Phasor Mesaurement Units (PMUs) for Power System Protection and Control. Published on Mar. 6, 2013.

Abdelaziz et al. Power System Observability With Minimum Phasor Measurement Units Placement. International Journal of Engineering, Science and Technology, vol. 5, No. 3, published in 2013.

* cited by examiner

METHOD AND ARRANGEMENT FOR ASCERTAINING A LOAD FLOW MAP WITHIN AN AC-VOLTAGE POWER SUPPLY GRID

CROSS REFERENCE TO RELATED APPLICATIONS

This Application is a continuation of International Patent Application number PCT/EP2020/081539, filed on Nov. 9, 2020, which claims priority to German Application number 10 2019 133 405.5, filed on Dec. 6, 2019. The contents of the above-referenced Patent Applications are hereby incorporated by reference in their entirety.

FIELD

The disclosure relates to a method for ascertaining a load flow map within an AC-voltage power supply grid, wherein a plurality of grid subscribers are arranged at a respective grid connection point in the power supply grid. The disclosure further relates to an arrangement of a plurality of grid subscribers and of at least one reference signal transmitter for ascertaining a load flow map within a power supply grid.

BACKGROUND

AC-voltage power supply grids are controlled by way of the frequency of the AC voltage. If the drawn power exceeds the fed-in power, the grid frequency then drops below its nominal value of, for example, 50 Hz in Europe. If the fed-in power exceeds the drawn power, the grid frequency then rises above the nominal value. The reason for this behaviour lies in the predominant generation of electrical power using rotating field machines. Since the grid frequency—unlike, e.g., a grid voltage—is the same over the entire power supply grid, the power dependence of the grid frequency is used to control the power being fed into the power supply grid in order to produce the required equality of fed-in and drawn power for the power supply grid on the whole at all times as far as possible.

Regardless of a condition for the equality of drawn and fed-in power that needs to be satisfied for the grid as a whole, for a secure operation of the power supply grid, how and to what extent power flows take place locally within the power supply grid is also relevant. High load flows are caused by a regional imbalance between drawn and fed-in power.

Knowledge of local power flows can be used to deduce an overload on certain transmission paths within the power supply grid, for example, or to identify an overload or impending overload on transformers, which convert power into different voltage levels within the power supply grid. Knowledge of local load flows is therefore also of interest for estimating a price trend for power in the power supply grid, since, for local subunits, prices in the power supply grid are also oriented toward the relationship between supply and demand, that is to say they can be used as a correction for an imbalance that has occurred.

A compilation of information about power flows between a multiplicity of points within a power supply grid is referred to as a load flow map within the scope of the application. Geographic coordinates can be used in this instance as can coordinates of the load flow map, as can structural coordinates of the power supply grid or other information characterizing the points. The term "map", however, does not imply how the power-flow-related information is represented.

Structural coordinates are coordinates that are derived from a structure of the power supply grid. Power supply grids usually have several levels which differ in terms of the voltages used and the distances spanned by this voltage over transmission paths. For example, there may be provision for a very-high voltage level, within which distances ranging from hundreds to thousands of kilometers are spanned at a very-high voltage of, for example, 380 kilovolts (kV). On the very-high voltage level, there are usually only a small number of distribution nodes present within the power supply grid. Connected to each of the distribution nodes of the very-high voltage level is a distribution level in which voltages of, for example, 120 kV are used. The nodes of the distribution level in turn constitute transition points to a medium-voltage level which is operated, for example, at a voltage of 20 kV. Nodes of the medium-voltage level in turn then constitute connection points to the low-voltage level in which the so-called mains voltage of, for example, 230 V prevails. The low-voltage distribution constitutes the shortest-range, but most ramified, distribution.

The document DE 10 2017 112 438 A1 discloses a control unit which controls electrical loads and/or local energy producers, for example a solar plant with an energy storage device, according to phase information at the grid connection point of a grid subscriber. The phase information is obtained by ascertaining the phase angle at the grid connection point and comparing the phase angle with a phase angle at a superordinate grid node. The phase angle is an indicator for the ratio of fed-in power to drawn power in a local section of the power supply grid. The phase information of the superordinate node is in this case gathered by a reference signal transmitter and transmitted to the control device. The control device uses the obtained phase information to locally control the consumption and feed-in behaviour and thus to contribute to a local balance of drawn and fed-in power on the lowermost voltage level of the power supply grid. However, conclusions about a power flow in the power supply grid on a superordinate voltage level cannot be derived from a singular measurement of this kind.

SUMMARY

The present disclosure is directed to provide a method and an arrangement which can be used to generate a load flow map of at least one section of a power supply grid.

A method according to the disclosure comprises: the plurality of grid subscribers ascertain a respective value which reflects an individual phase angle of the AC voltage of the power supply grid at the respective grid connection point. The respective value is transmitted in the form of data from the plurality of grid subscribers to a superordinate data receiver. Finally, the data are evaluated and a load flow map is generated on the basis of the values reflecting the individual phase angles.

A basic concept according to the disclosure is based on the fact that a load flow between two grid subscribers has an influence on the difference between the individual phase angle of these grid subscribers. The cause of this is a transmission impedance of the grid section between the grid subscribers, wherein the magnitude of the transmission impedance usually is unknown. By contrast, evaluation of the individual phase angles allows conclusions to be drawn about a causal load flow.

Embodiments of the method relate to various possibilities which gather and transmit quantities as the values which reflect the individual phase angle of the AC voltage of the power supply grid at the respective grid connection point.

In one embodiment, a reference signal is initially provided, containing a reference time which indicates a reference phase angle of an AC voltage in the power supply grid at a reference point. The reference signal represents a time at which the AC voltage in the power supply grid has a predetermined phase angle at the reference point, and can be, for example, the time of a voltage zero crossing. The reference signal is received by the plurality of grid subscribers. Further, the plurality of grid subscribers determine a respective individual phase angle of the AC voltage of the power supply grid at the respective grid connection point. This can be accomplished by using the predetermined phase angle on which the reference signal is based, that is to say, for example, a voltage zero crossing, the time difference between the reference time and the time determined by the grid subscriber then serving as a basis for determining the individual phase angle. However, the phase angle at the reference time can also be determined as an individual phase angle. The respective individual phase angle is then compared with the reference phase angle and a respective phase shift between the individual phase angle and the reference phase angle is ascertained. The phase shift is the value that is transmitted to the superordinate data receiver. In this alternative, as well as in those explained below, the superordinate data receiver can be part of a central evaluation unit which displays the generated load flow map, processes it further, analyzes it and/or forwards it to users of the load flow map.

In one embodiment, the reference signal is provided by a reference signal transmitter connected to a superordinate section of the power supply grid with respect to the grid subscribers and the reference phase angle is determined based on an AC voltage in the superordinate section of the power supply grid. When the grid subscribers are connected, for example, to a medium- or low-voltage level of the power supply grid, the reference signal transmitter is coupled to a distribution level or very-high voltage level of the power supply grid.

In one embodiment, the reference signal is provided by a reference signal transmitter. The reference signal transmitter generates its reference signal on the basis of an averaging of the phase angles of many phase measurements in a common voltage level as the reference phase angle and serves as reference signal for grid subscribers in this voltage level. Receiving and averaging of the phase angles in this instance can be performed by the superordinate data receiver. This embodiment is based on the knowledge that the average value of the phase angles of many phase measurements in the lower voltage level, for example, has a fixed phase relationship in relation to the phase of the directly superordinate voltage level. In this way, a reference signal transmitter that is connected directly to the superordinate level of the power supply grid can be dispensed with. There may be provision in this instance for a minimal phase difference between the connection point in the power supply grid and the average value of the many phase measurements to occur at times at which it is known that low power is drawn from the power supply grid, that is to say, for example, at night. It is to be expected therefore that comparatively low load flows also occur at night, such that a reference signal generated in this way can be assigned to a state of low load flow. Such a phase can then also be used as a reference phase for load flows at other times.

In one embodiment, determining the reference phase angle and the individual phase angles involves a time signal being received by the reference signal transmitter and the respective grid subscribers. The time signal can be, for example, a GPS (Global Positioning System) signal. The term "GPS" here encompasses any satellite-based positioning systems, such as Galileo, GLONASS or others. When using an identical time signal, that is to say a common time base, for the reference signal transmitter and the grid subscribers, it is possible to transmit a phase angle in the form of a singular point in time at which this phase angle was reached, even if this phase measurement is in the past. If the time base is known, the stored measurement in the subscriber device can be compared with the phase angle at the reference point, such that a difference phase with respect to the reference time can be ascertained. Delay time correction can optionally be performed.

By contrast, when transmitting a phase angle, the transmission path is not time-critical. For generating the load flow map, it is sufficient to map changes of phase angle on a time scale in the range of minutes. Accordingly, a time representing the phase angles does not need to be transmitted for every period of the AC voltage; rather, it is sufficient for a time to be transmitted, for example, several times a minute, or once in several minutes.

In one embodiment, ascertaining the respective value reflecting the individual phase angle involves the following acts being performed: a time signal which defines an absolute and common time for the power supply grid is generated and sent and this time signal is received by a reference signal transmitter (e.g., a transceiver) and the plurality of grid subscribers. A reference time which reflects a reference phase angle of an AC voltage in the power supply grid at the reference signal transmitter is ascertained. Up to this act, this embodiment corresponds to the previous embodiments. This embodiment differs, however, in that the phase angle of the AC voltage of the power supply grid at the respective grid connection point is also represented by an individual phase time. The reference time and the phase times reflecting the individual phase angles are transmitted to the superordinate data receiver and a respective phase shift is determined on the basis of the reference time and the individual phase times. The load flow map is then generated based on the individual phase shifts.

It is advantageous in one embodiment that only minimal processing of data is required on the part of the grid subscribers since the phase shifts are determined in the superordinate data receiver or the central evaluation unit. As described previously, a GPS time signal can be used. Such a signal is available almost anywhere and suitable receivers are available at low cost due to the widespread use of this system. The demands on the quality of the GPS signal are reduced compared to the demands necessary for GPS-based location determination since, for example, a signal from one satellite can be sufficient to obtain a sufficiently precise time signal, whereas location determination requires the signals from several satellites.

In one embodiment, ascertaining the respective value reflecting the individual phase angle involves the following acts being performed: the plurality of grid subscribers determine an individual phase angle of the AC voltage of the power supply grid at the respective grid connection point. The individual phase angle can be defined, for example, by a zero crossing of the AC voltage. The individual phase angle in this instance is measured relative to a time system of the respective grid connection point. This time system could be individual as long as it is available for a longer period of time. However, in one embodiment it is simpler and more practical to use a superordinate time system such as that of the GPS mentioned. The individual phase angle is averaged over a predetermined period of time and an average value is established as the individual phase reference angle. A respective phase shift is then determined on the basis of the phase reference angle and the respective individual phase angle and the load flow map is generated on the basis of the individual phase shifts. Since the deviation bandwidth of the lower grid level is known after some time (the bandwidth is determined by the maximum consumption surplus or the maximum generation surplus on this grid level), phase shifts that go beyond this can be assigned to the higher grid level. The averaging of the individual phase angles in this instance can be carried out, e.g., over a period of time of from about one week to about one month. Establishing the average value as the individual phase reference angles can be carried out repeatedly, for example, if it is observed that the average value is changing over a longer period of time.

As described in an earlier embodiment, a reference signal transmitter connected directly to the superordinate level of the power supply grid can be dispensed with in this way. Here too, there may also be provision for the averaging to take place at times at which it is known that low power is drawn from the power supply grid, that is to say, for example, at night.

Here, in one embodiment, the acts of averaging the individual phase angles, establishing an average value as individual phase reference angle and ascertaining the respective phase shift in the respective grid connection point can be performed, whereupon the ascertained respective phase shift is transmitted to the superordinate data receiver. In one embodiment, the individual phase angle is transmitted from the respective grid connection point to the superordinate data receiver and thereupon the acts of averaging the individual phase angles, establishing an average value as the individual phase reference angle and ascertaining the respective phase shift in the superordinate data receiver are performed.

In one embodiment of the method, the characteristic geographic coordinates of the grid subscribers are sent to the superordinate data receiver. These can be ascertained, for example, from the GPS signal or can be stored in the grid subscriber. In the load flow map, the phase shifts received or determined by the superordinate data receiver can then be assigned to the geographic coordinates. In an alternative representation of the load flow map, the phase shifts received by the superordinate data receiver can be assigned to structural coordinates of the power supply system. Structural coordinates of the power supply system are structural coordinates that relate to the structure of the power supply system and, for example, to the division into the different voltage levels.

In one embodiment of the method, for determining the phase shift, a component caused by phase rotation of certain transformer vector groups (e.g. the frequently used vector group Dy5, which causes a phase rotation of 30°) arranged between the grid connection point of the grid subscriber and the superordinate section of the power supply grid is ignored. At least a proportion of the phase shift caused by transformer vector groups is not load-dependent and is therefore not a direct indicator for the load flow at the respective grid connection point. The same applies for phase shifts that merely stem from the fact that different phase conductors (e.g. L1, L2 or L3) of a multi-phase grid are taken into consideration when determining the reference phase angle and the individual phase angle. In one embodiment, such phase shifts are also ignored. Therefore, in one embodiment, only a relative phase change is ever of interest and never an absolute phase. Phase shifts that are caused by systems for power factor correction may also be advantageously ignored.

In one embodiment of the method, a grid voltage is measured at the respective grid connection point, wherein the grid voltage is taken as a basis for compensating for an influence of the amplitude of the grid voltage on the determined value of the phase shifts. The influence of the amplitude of the grid voltage on the determination of the phase angle is small, but taking this influence into consideration contributes to increasing the accuracy when determining the phase angle. The determined phase angle is usually proportional to the amplitude of the grid voltage. This functional relationship can be used for compensation. The background to the compensation is that, for the same load, the phase shift is different if the voltage is different. The phase rotation is dependent on the current. For example, if the grid voltage at the house connection is 5% higher, 5% less current flows given the same load, which means that the phase shift is also correspondingly smaller.

An arrangement according to the disclosure of a plurality of grid subscribers and of at least one reference signal transmitter for ascertaining a load flow map within a power supply grid is characterized in that grid subscribers and/or the reference signal transmitter are configured to carry out one of the methods mentioned previously. The advantages described in connection with the methods are obtained.

BRIEF DESCRIPTION OF DRAWINGS

The disclosure will be explained in more detail below on the basis of an exemplary embodiment with the aid of figures. The figures show.

DETAILED DESCRIPTION

Figure 1:
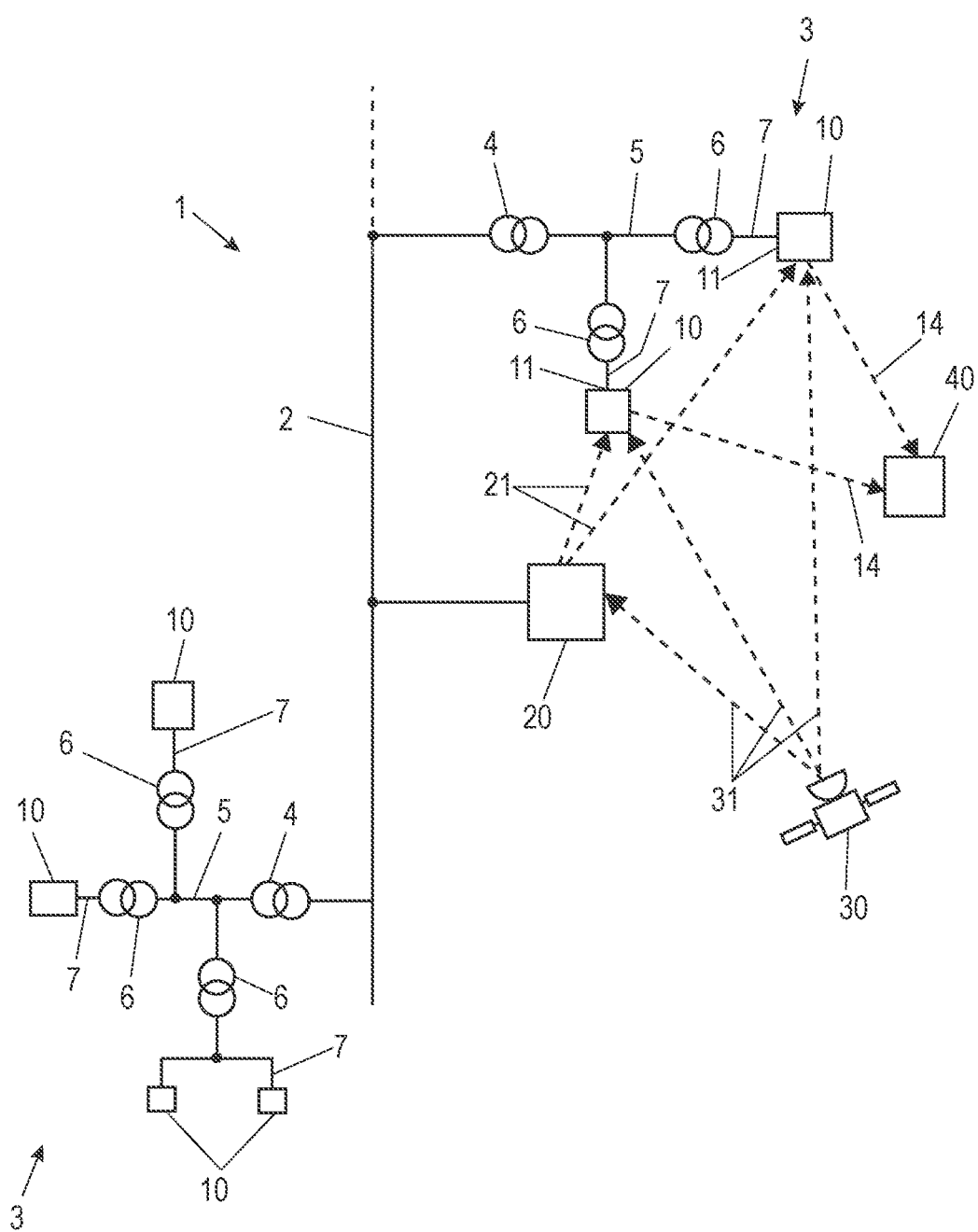
FIG. 1: a schematic representation of part of a power supply grid comprising a plurality of grid subscribers.

FIG. 1 shows a schematic diagram of a detail from an AC-voltage power supply grid 1. The power supply grid 1 has, in the example shown, a high-voltage transmission line 2 which represents the highest voltage level in the considered part of the power supply grid 1. Two geographically separate grid regions 3 are connected to the high-voltage transmission line 2. The grid regions 3 are coupled in each case by way of a power transformer 4, from which medium-voltage transmission lines 5 on the secondary side are used for further power distribution in the grid region 3. End customers or groups of end customers are connected to the power supply grid 1 by way of distribution transformers 6 and a low-voltage distribution 7 connecting to the latter.

The power supply grid 1 thus has, in the case shown, three different voltage levels, wherein the high-voltage level on the high-voltage transmission line 2 is 380 kV, for example, the medium voltage on the medium-voltage transmission line 5 is 20 kV, for example, and the low-voltage distribution 7 takes place at a voltage of 400 V, for example. The AC-voltage power supply grid 1 is usually of three-phase design.

It is noted that the methods and devices described in this application can also be transferred to power supply grids with a different number of voltage levels, with different voltages of the individual levels and also a different number of phases. For example, power supply grids can also be divided into four voltage levels, e.g. a very-high voltage or transmission level at 380 kV or 220 kV, a high-voltage level at 110 kV, a medium-voltage level at 10 kV to 30 kV and a low-voltage level at 400 V.

Grid subscribers 10 having a respective grid connection point 11 are connected to the low-voltage distribution 7. Details about the possible design of such grid connection points are explained below in connection with FIG. 2.

Furthermore, a reference signal transmitter 20 is present in the arrangement according to FIG. 1, which reference signal transmitter provides a phase reference signal 21 correlated with a phase angle of an AC voltage of the power supply grid 1 on the high-voltage transmission line 2. For example, the phase reference signal 21 can indicate a time of the zero crossing of the AC voltage. For this, the phase reference signal 21 can be a time-dependent signal that indicates the zero crossing, for example, by virtue of the zero crossing being reflected in an edge or a peak of the phase reference signal 21.

In the arrangement shown in FIG. 1, another representation of the zero crossing in the phase reference signal 21 is chosen, namely such that the reference signal transmitter 20 ascertains a time of the zero crossing and this time is output, in digitally coded form, as the phase reference signal 21. For the arrangement, this approach requires a common time base for reference signal transmitter 20 and all receivers that evaluate the phase reference signal 21. For this reason, there is provision for a central timer 30 which provides a time signal 31, on the basis of which various components have a precise time base that is the same within the arrangement. In one embodiment, use is made of satellites of the Global Positioning System (GPS) in order to have available a sufficiently precise time base on all components providing or evaluating the phase reference signal 21.

In one embodiment, the phase reference signal 21 in this case does not need to contain the zero crossing of every period, but can indicate a time of a zero crossing resulting from an averaging and corresponding recalculation of a multiplicity of zero crossings over a predetermined period of time. The period of time can be in the range from seconds to minutes. Moreover, the phase reference signal can contain additional information which allows the phase angle of the reference at other times within or else outside of the averaging period to be calculated.

A PLL (phase-locked loop) circuit can also optionally be used, which synchronizes to the AC voltage of the power supply grid 1 and which outputs a pure sinusoidal signal whose zero crossings are representative of those of the grid voltage.

Since the phase reference signal 21 in such a case indicates the zero crossing not in real time, but rather in relation to the common time base, a speed of transmission of the phase reference signal 21 to evaluating components is not critical. The phase reference signal 21 can thus also be transmitted, for example, by data transmission networks, for example, the Internet.

In one embodiment, the digitally transmitted data allows simple calculation of corresponding times for a plurality of zero crossings within a time interval. This makes it easier to ascertain an associated phase shift, since in this way reference can be made to a common zero crossing at a multiplicity of points in the power supply grid, at least by numerical methods.

The method according to the application for generating a load flow map is based on, in one embodiment, the basic concept that the plurality of grid subscribers 10 gather information at their respective grid connection point 11, from which information an individual phase angle of the AC-voltage signal of the power supply grid 1 can be determined, and that this information is transmitted to a superordinate data receiver which evaluates the information and generates a load flow map therefrom.

In the arrangement according to FIG. 1, a central evaluation unit 40 is present for the evaluation and for generating the load flow map, which central evaluation unit comprises the superordinate data receiver receiving corresponding phase information 14 from the grid subscribers 10. For the sake of clarity, the exchanged information and signals, specifically the time signal 31 from the timer 30, the phase reference signal 21 from the reference signal transmitter 20 and the phase information 14 from the grid subscribers 10, are only shown in FIG. 1 for two of the grid subscribers 10. The grid subscribers 10 in the grid region 3 shown at the bottom left of FIG. 1 also receive the mentioned phase reference signal 21 and the time signal 31 and send the phase information 14 ascertained at their grid connection points 11 to the central evaluation unit 40.

In the example embodiment shown, all the grid subscribers 10 are connected to the low-voltage distribution 7. It is also conceivable to couple grid subscribers 10 that gather and transmit phase information 14 to the medium-voltage transmission lines 4 or high-voltage line 2, and thus also to take into consideration phase information directly from the medium-voltage level or high-voltage level of the power supply grid 1.

Figure 2:
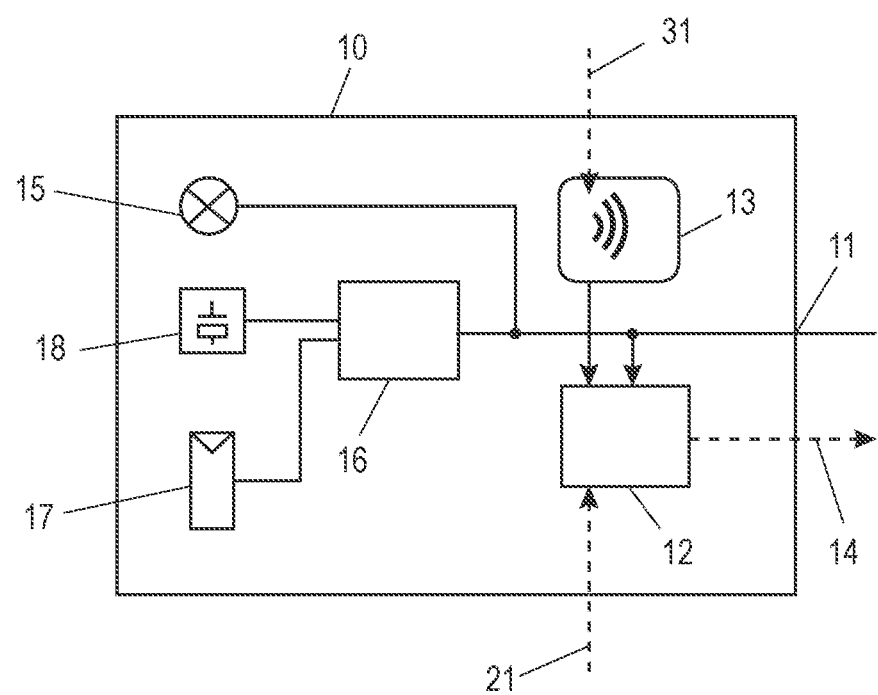
FIG. 2: a schematic block diagram of a grid subscriber.

A possible design of a grid subscriber is represented in FIG. 2 in the form of a schematic block diagram. As described in connection with FIG. 1, the grid subscriber 10 is connected to the power supply grid 1 by way of a grid connection point 11. Loads 15 within the grid subscriber 10 are supplied with power from the grid connection point 11. Further, an inverter 16 is present in this grid subscriber 10 as part of a local power generation plant. In the case shown, the inverter 16 is coupled to a photovoltaic generator 17 and/or a storage device 18. Electrical power generated locally by the photovoltaic generator 17 can be either fed into the power supply grid 1 via the grid connection point 11 and/or temporarily stored in the storage device 18 in order to be used later or fed in later.

The grid subscriber 10 further has a phase detector 12 which, in a comparable way to the reference signal transmitter 20, evaluates phase information of an AC voltage of the power supply grid 1, here the AC voltage at the grid connection point 11. This evaluation can again be performed, for example, by measuring a zero crossing of the AC voltage. As explained in connection with the reference signal transmitter 20, a plurality of zero crossings can be averaged for this purpose, which can be done, for example, by using a PLL circuit or a PLL algorithm.

The grid subscriber 10 further comprises a GPS receiver 13 receiving the time signal 31 from the timer 30 and making it available to the phase detector 12.

In one embodiment of the grid subscriber 10, the phase detector 12 can be configured to ascertain the zero crossing of the AC voltage and to output the corresponding time (measured in the time base provided by the timer 30) as phase information 14. If the time signal 31 is known, the evaluation unit 40 can, in that case, take the time from the phase information 14 and the time of the zero crossing from the phase reference signal 21 as a basis for determining a phase shift for the grid subscriber 10 and performing processing to generate the load flow map.

In the example embodiment shown, the phase detector 12 is configured to receive the phase reference signal 21 itself and to compare it with the determined zero crossing at the grid connection point 11. In that case, an individual phase shift between the AC voltage at the grid connection point 11 and the AC voltage that the reference signal transmitter 20 evaluates can be output directly as phase information 14. Knowledge of the time base of the timer 30 is not required in the central evaluation unit 40, as is symbolized in FIG. 1 as well.

In embodiments of the grid subscriber 10 shown, there may be provision for geographic location coordinates of the grid subscriber 10, in addition to the phase information 14, to be transmitted to the central evaluation unit 40 as well. These can be stored in the grid subscriber 10 on the basis of its installation location. It is also possible to determine the location coordinates from the signal received by the GPS receiver 13 and then to transfer them to the central evaluation unit 40.

In summary, the central evaluation unit 40 of FIG. 1 receives with the phase information 14 either information that indicates the individual phase angle at the individual grid connection points 11 or information from which the individual phase shift at each of the grid connection points 11 can be ascertained. The individual phase shift in this instance relates in each case to the phase of the power supply grid 1 that is chosen as the reference phase angle at the location of the reference signal transmitter 20, that is to say here on the high-voltage transmission line 2.

A negative phase shift indicates that there is an energy deficit at the grid connection point 11, that is to say that, in the area in which the grid connection point 11 is located, more energy is being drawn from the power supply grid than is being fed in. A positive phase shift indicates that, in the area surrounding the grid connection point 11, more energy is being fed into the power supply grid 1 than is being drawn.

The load flows ascertained in this way at the location of the various grid connection points 11, that is to say from the grid connection point 11 to adjacent grid connection points, are information of the load flow map. This information is assigned to specific coordinates of the load flow map, wherein the geographic coordinates of the respective grid connection points can be chosen as coordinates, for example. If a structure of the power supply grid 1 is known, structural coordinates of the power supply grid 1 can also be used as coordinates in the load flow map.

It is also conceivable to use appropriate, possibly adaptively working and self-learning, algorithms to derive a structure of the power supply grid 1 from the load flow data themselves which is then used to represent the load flow data in the form of a load flow map.

In the grid subscriber 10 shown in FIG. 2, the phase detector 12 and the GPS receiver 13 can be advantageously arranged in the inverter 16. An inverter often already has components for phase detection in order to be able to feed the generated grid voltage into the power supply grid 1 with the correct phase. These components can be used within the scope of the method according to one embodiment of the application. Data interfaces, which can be used to receive the reference signal 21 and/or to transmit the phase information 14, are also often already present in inverters. A charging station for electric vehicles can likewise be used as a grid subscriber 10. These, too, often have components that can be used within the scope of the method according to one embodiment of the application.

In other embodiments, it is also conceivable for the phase detector 12 and the GPS receiver 13 to be integrated into an energy meter ("electricity meter"). Such a meter is usually present at each grid subscriber 10, even though this is not shown in FIG. 2 for reasons of clarity.

Figure 3:
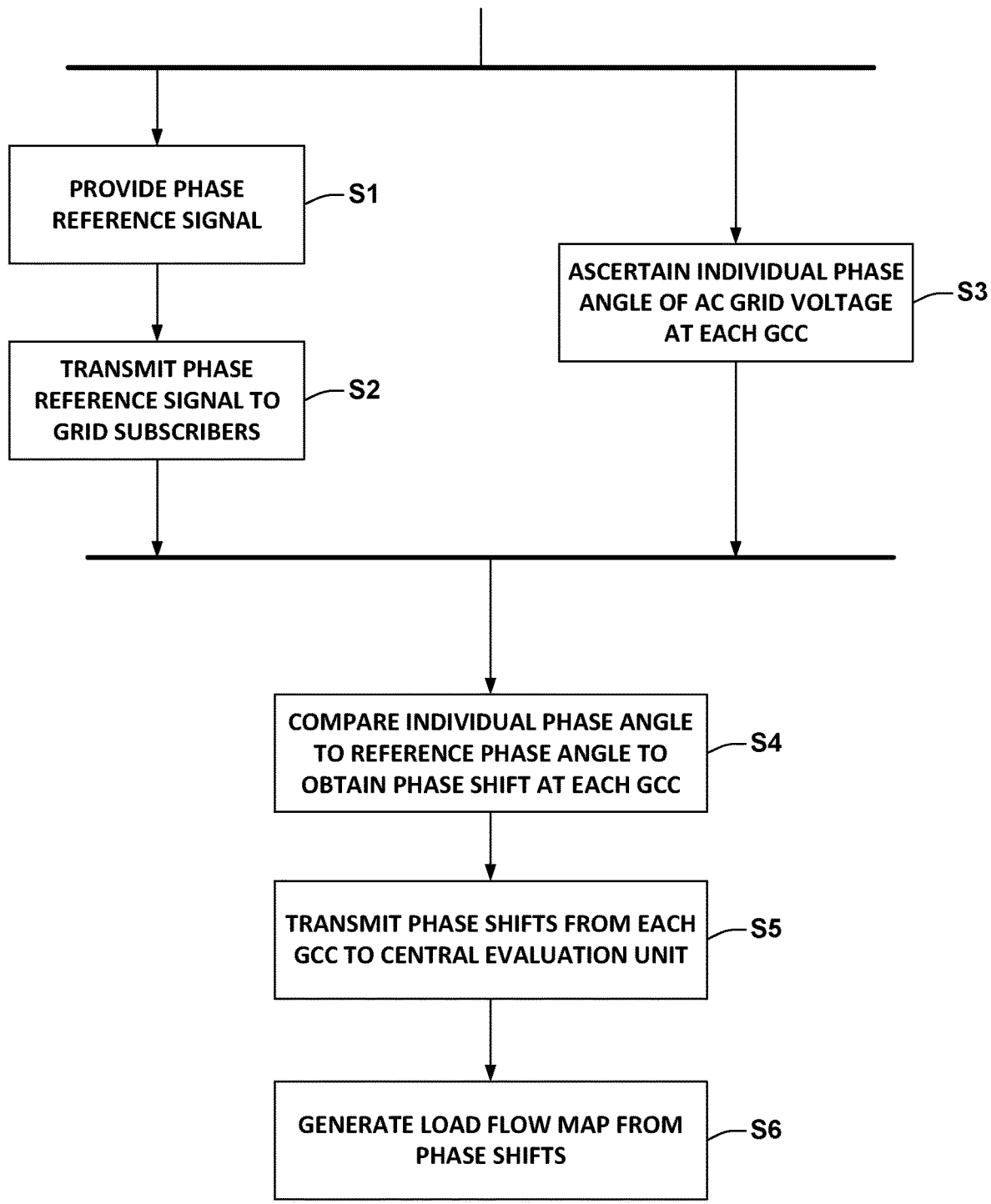
FIG. 3: a flow chart of an example embodiment of a method for ascertaining a load flow map.

FIG. 3 shows an embodiment of a method according to the application in the form of a flow chart. The method is explained below by way of example with reference to the arrangement according to FIG. 1 and the design of the grid subscriber 10 according to FIG. 2.

In a first act S1, a phase reference signal 21 is provided, for example by a reference signal transmitter 20 arranged on a superordinate transmission line, for example the high-voltage transmission line 2 of the power supply grid 1. The reference signal contains a reference time, at which an AC voltage on the high-voltage transmission line 2 or—in the case of another design of the power supply grid—a very-high voltage line or transmission line assumes a certain phase angle, for example has a zero crossing. In order to be able to indicate the reference time in absolute terms, the reference signal transmitter 20 receives a time signal 31 from a timer 30, in particular a GPS satellite.

In a second act S2, the phase reference signal 21 is transmitted to a plurality of grid subscribers 10. Each grid subscriber 10 determines a reference phase angle $\phi r$ therefrom. For this purpose, the time signal 31 from the timer 30, for example, from the GPS satellite, is also received by the grid subscriber 10, such that each grid subscriber 10 has the same time base as the reference signal transmitter 20.

In parallel with acts S1 and S2, in an act S3, each of the grid subscribers 10 ascertains an individual phase angle $\phi$ of the AC voltage of the power supply grid 1 at the respective grid connection point 11.

In a following act S4, the individual phase angle $\phi$ which was determined in act S3 is compared with the reference phase angle $\phi r$, which was determined in act S2 on the basis of the received phase reference signal 21, and a phase shift $\Delta\phi$ is ascertained. In the subsequent act S5, the ascertained phase shift $\Delta\phi$ is transmitted from each of the grid subscribers 10 to a central evaluation unit 40 as superordinate data receiver.

The ascertained phase shift $\Delta\phi$ in this instance can contain components which are caused, for example, by transformer vector groups, e.g. the transformers 4 and 6. Systems for power factor correction also cause such components. Phase shifts of this kind are also referred to as structural phase shifts. Since they are not load-dependent, they are not relevant for generating the load flow map and are, in one embodiment, deducted from the ascertained phase shift. For this purpose, the structural phase shift can be ascertained in a learning phase, for example, or, if it is known, can be entered on installation. The correction of the ascertained phase shift $\Delta\phi$ for the non-load-dependent component can be performed within the respective grid connection point or else in the central evaluation unit 40.

In an act S6, the transmitted data are evaluated in the central evaluation unit 40 and a load flow map is generated as the result from the individual phase angles $\phi$ or the phase shifts $\Delta\phi$. Received geographic coordinates can likewise be used as a basis for generating the load flow map.

What is claimed:
1. A method for ascertaining a load flow map within a power supply grid using a central evaluation circuit, wherein a plurality of grid subscribers are each arranged at a respective grid connection point in the power supply grid, comprising:

ascertaining, using a respective phase detector circuit by each of the plurality of grid subscribers, a respective value reflecting an individual phase angle ($\phi$) of an AC voltage of the power supply grid at the respective grid connection point of each of the plurality of grid subscribers;

transmitting, using a respective transmitter circuit, the respective values in the form of data from the respective plurality of grid subscribers to a superordinate data receiver circuit of the central evaluation circuit; and evaluating the data reflecting the individual phase angles ($\phi$) and generating a load flow map using a processor circuit of the central evaluation circuit based on the values reflecting the individual phase angles ($\phi$), wherein ascertaining the respective value reflecting the individual phase angle ($\phi$) of the AC voltage of the power supply grid at the respective grid connection point comprises:

providing a time signal that defines an absolute and common time for the power supply grid;

receiving the time signal from a reference signal transmitter and from the plurality of grid subscribers;

ascertaining a reference time which reflects a reference phase angle ($\phi r$) of an AC voltage in the power supply grid at the reference signal transmitter;

ascertaining, by the plurality of grid subscribers, a respective individual phase time which reflects an individual phase angle ($\phi$) of the AC voltage of the power supply grid at the respective grid connection point for each of the plurality of grid subscribers;

transmitting the reference time and the individual phase times to the superordinate data receiver circuit; and ascertaining a respective individual phase shift ($\Delta\phi$) based on the reference time and the individual phase times for each of the plurality of grid subscribers;

wherein the load flow map is generated based on the individual phase shifts ($\Delta\phi$).

2. The method as claimed in claim 1, wherein the time signal is a GPS signal.

3. The method as claimed in claim 1, further comprising transmitting the individual phase angles ($\phi$) from the respective plurality of grid connection points to the superordinate data receiver, and thereupon averaging the individual phase angles ($\phi$), establishing an average value as an individual phase reference angle, and ascertaining the respective individual phase shifts ($\Delta\phi$) is performed in the superordinate data receiver.

4. The method as claimed in claim 1, wherein the time signal is a GPS signal, and wherein characteristic geographic coordinates are ascertained from the GPS signal.

5. A method for ascertaining a load flow map within a power supply grid using a central evaluation circuit, wherein a plurality of grid subscribers are each arranged at a respective grid connection point in the power supply grid, comprising:

ascertaining, using a respective phase detector circuit by each of the plurality of grid subscribers, a respective value reflecting an individual phase angle ($\phi$) of an AC voltage of the power supply grid at the respective grid connection point of each of the plurality of grid subscribers;

transmitting, using a respective transmitter circuit, the respective values in the form of data from the respective plurality of grid subscribers to a superordinate data receiver circuit of the central evaluation circuit; and evaluating the data reflecting the individual phase angles ($\phi$) and generating a load flow map using a processor circuit of the central evaluation circuit based on the values reflecting the individual phase angles ($\phi$), wherein ascertaining the respective value reflecting the individual phase angles ($\phi$) of the AC voltage of the power supply grid at the respective grid connection points of the plurality of grid subscribers comprises:

ascertaining, by each of the plurality of grid subscribers, an individual phase angle ($\phi$) reflecting the AC voltage of the power supply grid at the respective grid connection points;

averaging the individual phase angles ($\phi$) for each of the plurality of grid subscribers over a predetermined period of time and establishing an average value as an individual phase reference angle; and ascertaining a respective individual phase shift ($\Delta\phi$) based on the individual phase reference angle and each of the respective individual phase angles;

wherein the load flow map is generated based on the individual phase shifts ($\Delta\phi$), and wherein averaging the individual phase angles ($\phi$), establishing an average value as the individual phase reference angle, and ascertaining the respective individual phase shifts ($\Delta\phi$) at the plurality of grid connection points are performed, whereupon the ascertained respective individual phase shifts ($\Delta\phi$) are transmitted to the superordinate data receiver.

* * * * *